United States Patent
Blake

(10) Patent No.: US 6,195,863 B1
(45) Date of Patent: Mar. 6, 2001

(54) DISC BRAKE PISTON INSTALLATION TOOL

(76) Inventor: Basil R. Blake, 6481 Rapids Rd., Lockport, NY (US) 14094

( * ) Notice: Subject to any disclaimer, the term of this patent is extended or adjusted under 35 U.S.C. 154(b) by 0 days.

(21) Appl. No.: 09/544,038

(22) Filed: Apr. 6, 2000

(51) Int. Cl.[7] .................................................. B23P 19/04
(52) U.S. Cl. .............................................. 29/239; 29/266
(58) Field of Search .............................. 29/239, 266, 233, 29/256, 258, 263, 269, 237, 427, 401, 252; 269/241, 249; 254/100, 101; 188/72.5

(56) References Cited

U.S. PATENT DOCUMENTS

| | | | |
|---|---|---|---|
| 3,654,689 | * 4/1972 | Schwarz | 29/427 |
| 3,786,551 | * 1/1974 | Gregg et al. | 29/266 |
| 4,903,391 | * 2/1990 | Franks | 29/239 |
| 5,018,261 | * 5/1991 | Markous | 29/239 |
| 5,269,053 | * 12/1993 | Hicks | 29/402.01 |
| 5,850,680 | * 12/1998 | Verrier et al. | 29/257 |
| 6,085,398 | * 7/2000 | Arch | 29/239 |

* cited by examiner

Primary Examiner—David A. Scherbel
Assistant Examiner—Daniel Shanley
(74) Attorney, Agent, or Firm—Arthur S. Cookfair

(57) ABSTRACT

A pneumatically operated disc brake piston installation tool is disclosed for use in installing a piston into the piston bore of a disc brake caliper housing. The tool comprises a first piston engaging plate and a second plate positionable against the inside surface of an outer shoe bracket of the caliper housing. A cylinder extends from the second plate. A piston shaft is centrally attached to the first plate and extends perpendicularly therefrom, passing slidably through an opening in the second plate into the cylinder. In response to pneumatic pressure, the piston shaft is pushed outwardly against the piston to force the piston back into the piston bore of the caliper housing.

8 Claims, 2 Drawing Sheets

DISC BRAKE PISTON INSTALLATION TOOL

BACKGROUND OF THE INVENTION

1. Field of the Invention

The present invention relates to a disc brake assembly and disassembly apparatus and, in particular, to a tool for positioning and installing a piston into the piston cylinder of disc brake caliper housing.

2. Prior Art

Disc brake assemblies in automobiles and trucks typically include a rotor disc mounted on the axle of the vehicle and a caliper assembly including one or more hydraulically operated pistons which control the movement of brake pads on each side of the disc causing them to contact the disc and prevent or inhibit the rotation thereof. The caliper typically includes an outer support bracket. After a period of use, parts of the caliper assembly, especially the brake pads and pistons may require replacement. As the brake pads wear due to friction against the disc, they become thinner and the piston assumes an extended position and must be retracted into the piston bore to allow room for new (thicker) pads to replace them. Considerable force may be necessary to retract the pistons into the bore and allow room for the new pads to be mounted.

One of the more common techniques for the retraction of pistons into the bore of a disc brake assembly involves the use of a C-clamp to apply pressure to the piston. The use of a C-clamp (as well as some other tools that have been used for this purpose) often involves difficulty with respect to the alignment of the piston during retraction. The clamp may tend to shift during the procedure, causing the piston to shift from the axial alignment within the piston bore. This may result in the jamming of the piston in the bore or cause damage to the seals and may, as a consequence, require a more complete rebuilding of the assembly.

Various tools and methods have been developed for the retraction of pistons or the installation of new pistons in disc brake assemblies, release of frozen pistons as well as various other problems associated with disc brake assemblies in general and disc brake pistons in particular.

U.S. Pat. No. 3,654,689 to Schwarz discloses a method and apparatus for releasing frozen pistons through the use of an hydraulic system to force the piston(s) against a spacer block. The piston can then be drawn back into the piston bore with the aid of a vacuum line.

U.S. Pat. No. 5,018,261 to Markous and U.S. Pat. No. 5,850,680 to Verrier et al. describes a disc brake assembly tools wherein the piston is forced back into the piston bore by pressure from a threadably adjustable arm positioned in the channel of a caliper body.

It will be appreciated that, although a variety of disc brake caliper tools are known, there is a continuing need for improved tools and methods, especially for use in the retraction of pistons or the installation of new pistons in disc brake assemblies.

It is an object of the present invention to provide a new and improved tool for the retraction of a piston into the piston bore of a disc brake caliper assembly.

It is a further object to provide a piston installation tool for the repair of disc brake caliper assemblies that will exert an even pressure on the edges of a piston and thus maintain the proper axial orientation of the piston during installation.

It is a still further object to provide a disc brake piston installation tool that is easy to use and is powered by pneumatic pressure.

It is a still further object to provide such a tool that may be adapted to fit a variety of disc brake calipers and that may be used to determine the resistance of a piston to retraction.

SUMMARY OF THE INVENTION

The above and other objects are achieved in accordance with the present invention, which provides a pneumatically operated piston installation tool for use with disc brake caliper assemblies having a piston movably disposed in a piston bore at one side of a caliper housing and an outer support bracket at the opposite side. The piston installation tool comprises:

- a first plate, positionable within the disc brake caliper housing in contact with an outer edge of an extended piston;
- a second plate in alignment with, and spaced apart from, the first plate and positionable against an inside surface of the outer support bracket;
- a piston shaft attached at one end to the first plate at a central point thereof and extending perpendicularly therefrom passing slidably through a central opening in the second plate into a surrounding cylinder attached to the second plate; and
- pneumatic means for moving the piston shaft out of the cylinder and pushing the first plate against the outer edge of the piston in a direction away from the second plate, forcing the piston to retract into the piston bore.

Compressed air for the operation of hand-held pneumatic tools is generally available in garages and maintenance shops where repair work on disc brake assemblies is commonly carried out. The piston installation tool of the present invention includes a hose that can be plugged into the compressed air system in the same manner as other common pneumatic tools, such as pneumatic drills, impact guns, and the like to supply pneumatic pressure to the cylinder.

In a preferred embodiment, the piston installation tool of this invention includes a pressure gauge that displays the pressure being applied. By observing the pressure gauge, the amount of pressure necessary to move the piston can be determined. Thus, the gauge can be used to determine the resistance of the piston to retraction and also can be used as an indicator of a frozen piston. Furthermore, the resistance of a piston to retraction can be compared with the resistance of a piston in the disc brake assembly on the opposite wheel and thus determine whether the brakes are stopping evenly or not.

In a further preferred embodiment, the cylinder attached to the second plate includes a return mechanism that operates when the pneumatic pressure is withdrawn. Thus, for example the cylinder may be a single acting cylinder with a spring return, that is, incorporating a built-in spring which returns the piston shaft to its starting position.

In use, the disc brake caliper assembly is removed from a vehicle, generally with the hydraulic brake lines remaining in place and the brake pads are removed. The installation tool is then placed in the caliper with the first plate positioned against the outer edge of the brake piston and the second plate brace against the inside surface of the disc brake outer support bracket. Pneumatic pressure is then applied to move the piston shaft out of the cylinder and move the first plate against the brake piston, and push it back into the piston bore of the caliper housing.

One embodiment of the disc brake installation tool of the invention is suitable for installing two pistons simultaneously in a dual piston disc brake caliper assembly. For this purpose, two of the installation tools that would be used for the installation of single piston disc brake assemblies can be yoked in a side by side relationship. The first plate may be wide enough to position across two side by side pistons in a dual piston caliper, or may be separate plates. The second plate may comprise two separate plates, each attached to one of the yoked cylinders. Preferably, in this embodiment, the second plate is a single plate, wide enough for attachment to both cylinders. In this manner it may also serve as the yoke to hold the two cylinders together.

BRIEF DESCRIPTION OF THE DRAWINGS

The present invention and the manner in which it may be used is further illustrated with reference to the accompanying drawings wherein.

DETAILED DESCRIPTION OF THE DRAWINGS

Figure 1:
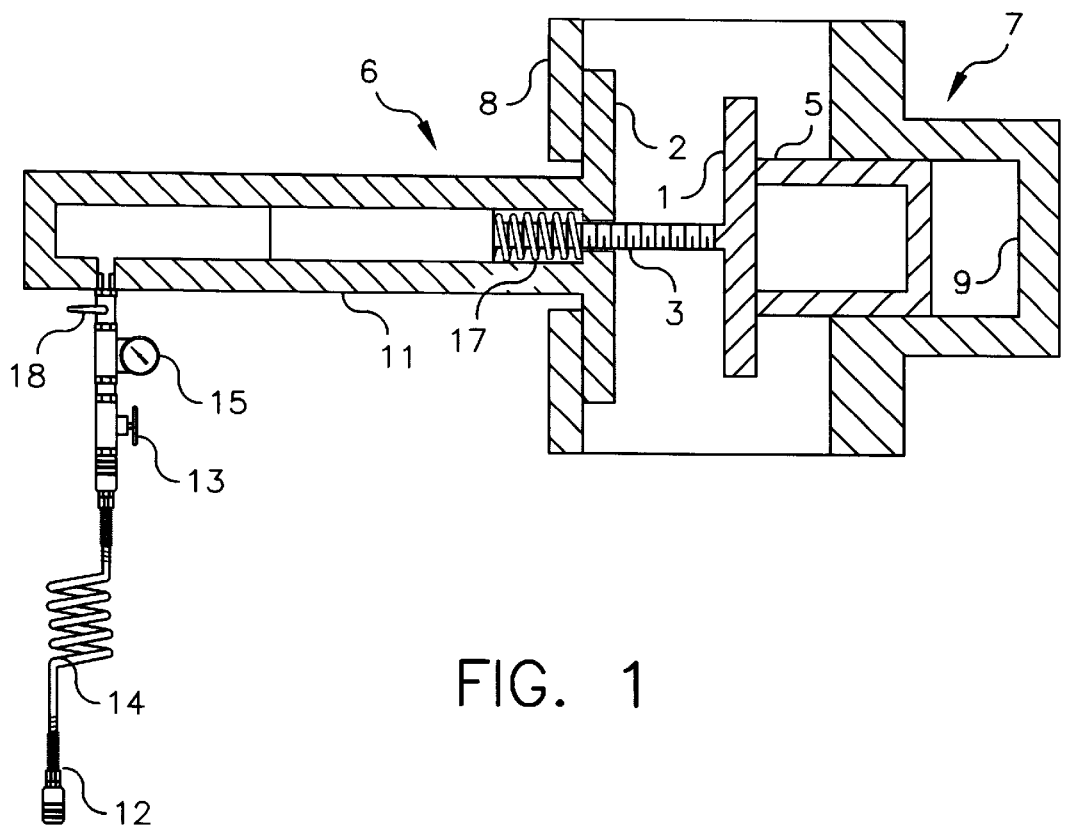
FIG. 1 is a cross-sectional and partial plan view of a pneumatic piston installation tool of this invention positioned within a disc brake caliper assembly with the piston extending partially out of the piston bore.

With reference to FIG. 1, the piston installation tool 6 of the present invention is shown in position for the installation or reinstallation of a piston in a disc brake caliper housing 7. The tool includes a first plate 1 attached at the end of a piston shaft 3. First plate 1 is positioned against the outer edge of disc brake piston 5. A second plate 2, attached at the end of cylinder 11, is positioned against the inside surface of outer shoe support bracket 8 of caliper housing 7. Shaft 3, in axial alignment with disc brake piston 5 and piston bore 9, passes slidably through second plate 2 and into cylinder 11, where it fits closely against the inner surface of the cylinder in the manner of a piston. With piston shaft 3 in place and valve 13, on compressed gas line 14, closed, cylinder 11 is a closed cylinder. When socket 12 is connected to a compressed air source and valve 13 is turned on, piston shaft 3 is forced outwardly through cylinder 11 and second plate 2, causing plate 1 to press against piston 5 and, in turn, causing the piston to retract into piston bore 9.

Figure 2:
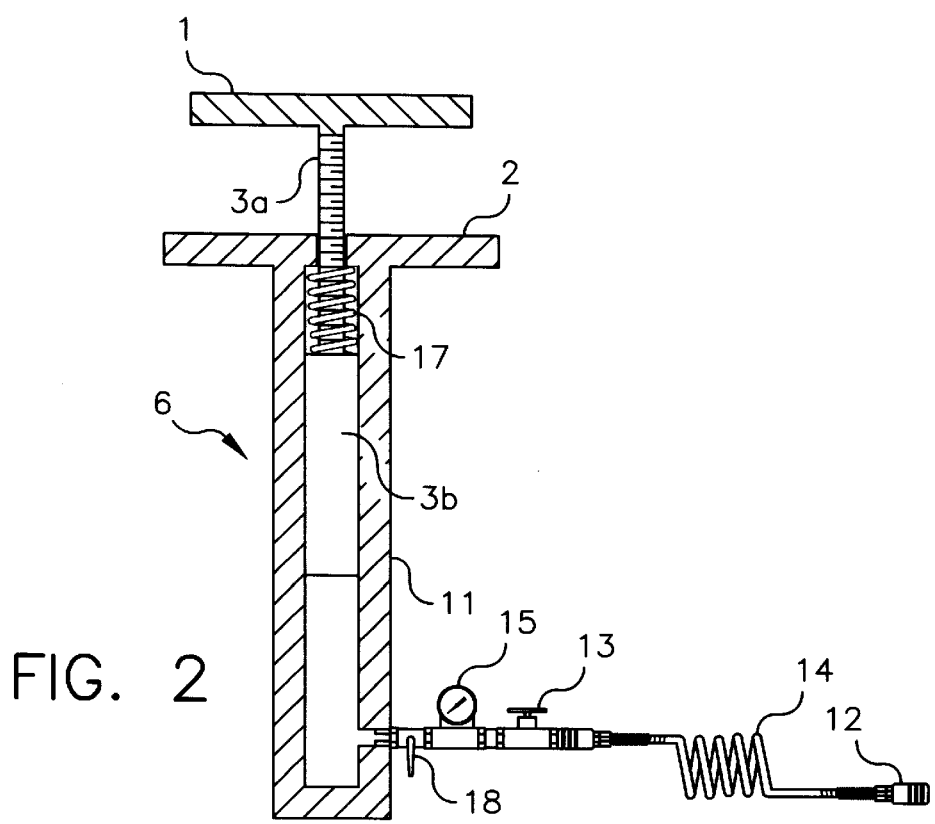
FIG. 2 is a cross-sectional and partial plan view of an installation tool according to a preferred embodiment of the invention.

In a preferred embodiment, as shown in FIG. 2, piston shaft 3 comprises a first shaft portion 3a attached at one end to plate 1 and threadably connected at the other end to the internal threads (not shown) in second shaft portion 3b. With this embodiment of the installation tool 6, the distance between first plate 1 and second plate 2 can be adjusted prior to positioning in the disc brake caliper housing. Adjustment of the distance is readily accomplished by threading the male threads of outer shaft portion 3a into or out of the internal threads of base shaft portion 3b until the desired distance is achieved. When the tool is in position as shown in FIG. 1, connector 12 may be connected to a source of compressed gas, such as compressed air (not shown), and valve 13 turned on. Gas pressure in cylinder 11 may then be controlled by switch 18 to force shaft 3a/3b outward causing plate 1 to push the piston back into the piston bore. Upon release of the pneumatic pressure, piston shaft 3a/3b will be returned to its original position by spring 17.

Figure 3:
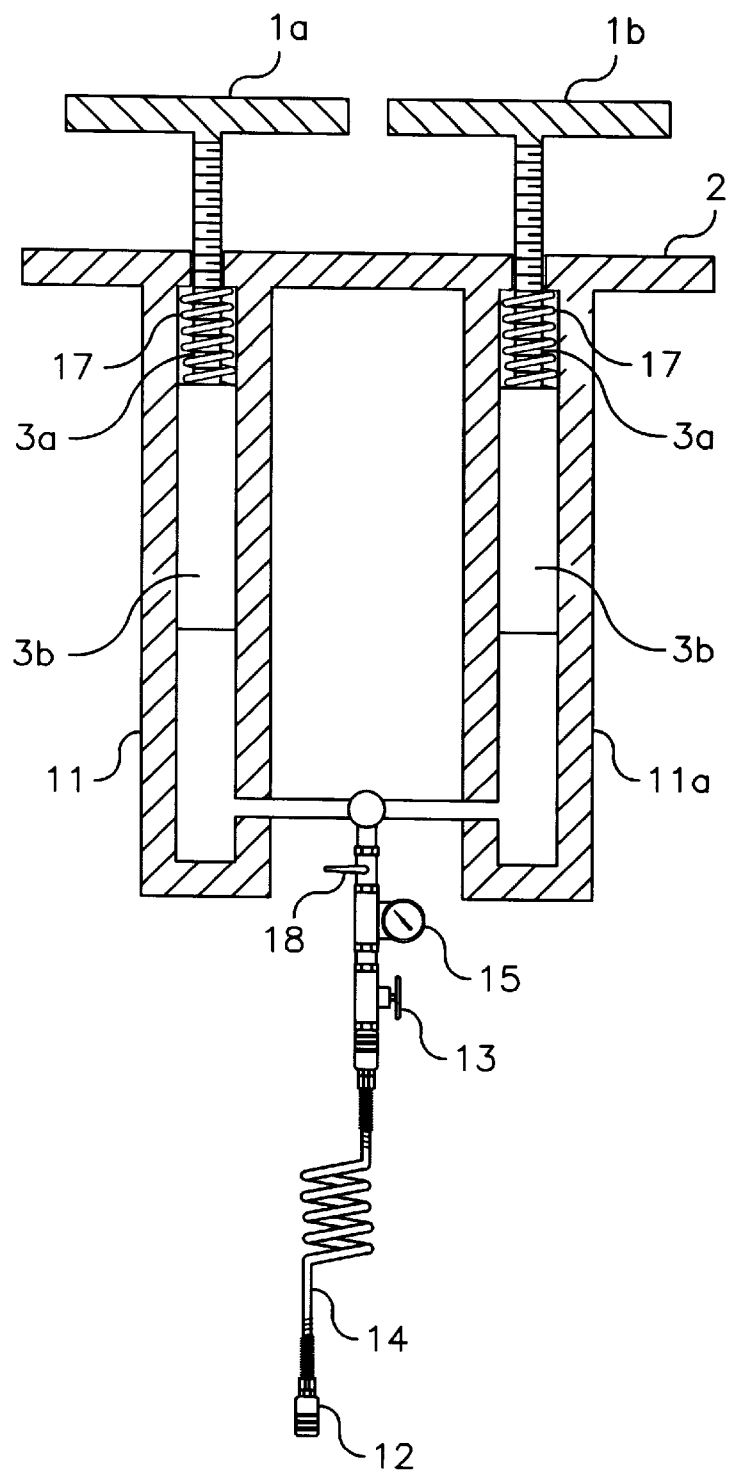
FIG. 3 is a cross-sectional and partial plan view of an alternate embodiment of the present invention for use in dual piston disc brakes.

An alternate embodiment of the invention, as depicted in FIG. 3, may be used for the installation of two pistons simultaneously in a disc brake caliper system having dual pistons. In the embodiment shown, the installation tool comprises two cylinders 11 attached to second plate 2. In each cylinder, piston shaft portions 3a and 3b pass slidably in or out of cylinder 11, through an opening in second plate 2 in response to pneumatic pressure within cylinder 11. The outward movement of piston shaft 3a/3b results in each plate 1 pushing against the respective disc brake piston and forcing it to retract. Pneumatic pressure is provided when connector 12 is connected to a source of compressed gas (not shown) and valve 13 is turned on. The amount of pressure applied to the cylinder is shown on gauge 15. The application of the pneumatic pressure to the outward movement of piston shaft 3a/3b is conveniently controlled by off/on switch 18. When the pressure is release, the piston shaft is returned to its original position by spring 17.

Although the invention has been described with reference to certain preferred embodiments, it will be appreciated that modifications and variations may be made without departing from the spirit and scope of the invention as defined in the accompanying claims.

What is claimed is:

1. A pneumatically operated disc brake piston installer comprising:
   A) a first plate positionable within a disc brake caliper housing in contact with an outer edge of an extended disc brake piston;
   B) a second plate in alignment with and spaced apart from the first plate and positionable against an inside surface of an outer shoe bracket of said disc brake caliper housing;
   C) a piston shaft attached to said first plate at a central point thereof and extending perpendicularly therefrom passing slidably through an opening in said second plate into a surrounding cylinder attached to said second plate; said piston shaft being controllably moveable in an axial direction in response to pneumatic pressure within said cylinder;
   D) a source of pneumatic pressure adapted for controllably moving said piston shaft out of said cylinder and pushing said first plate in a direction away from said second plate.

2. A pneumatically operated disc brake piston installer according to claim 1 wherein said piston shaft comprises a first portion and a second portion threadably connected to permit changing of the length of said shaft with a resultant change of distance between said first plate and said second plate.

3. A pneumatically operated disc brake piston installer according to claim 1 wherein said source of pneumatic pressure comprises a hose having a connector at one end connectable to a source of compressed gas and connected at another end to said cylinder, and a control valve to allow the controllable transmission of gas pressure from said source to said cylinder.

4. A pneumatically operated disc brake piston installer according to claim 1 including a pressure gauge for the measurement of gas pressure transmitted to said cylinder.

5. A pneumatically operate d disc brake piston installer according to claim 1 further including a spring within said cylinder adapted to move said piston shaft into said cylinder.

6. A pneumatically operated dual disc brake piston installer for the installation of dual pistons in a dual disc brake caliper housing, said dual disc brake piston installer comprising two of said disc brake installers according to claim 1 yoked in a side by side relationship.

7. A pneumatically operated disc brake piston installer comprising:

A) a first plate positionable within a disc brake caliper housing in contact with an outer edge of an extended disc brake piston;

B) a second plate in alignment with and spaced apart from the first plate and positionable against an inside surface of an outer shoe bracket of said disc brake caliper housing;

C) a piston shaft attached to said first plate at a central point thereof and extending perpendicularly therefrom, passing slidably through an opening in said second plate into a surrounding cylinder attached to said second plate; said piston shaft being controllably moveable in one axial direction in response to pneumatic pressure within said cylinder; and in an opposite axial direction in response to a spring means within said cylinder; said piston shaft comprising a first portion and a second portion threadably connected to permit changing of the length of said position shaft with a resultant change of distance between said first plate and said second plate;

D) a controllable source of said pneumatic pressure adapted for moving said piston shaft out of said cylinder and pushing said first plate in a direction away from the second plate.

8. A pneumatically operated disc brake piston installer according to claim 7 wherein said source of pneumatic pressure comprises a hose having a connector at one end connectable to a source of compressed gas, and connected at another end to said cylinder, and a control valve for the controllable transmission of gas pressure from said source to said cylinder.

* * * * *

US 6,195,863 C1

(12) EX PARTE REEXAMINATION CERTIFICATE (10770th)
United States Patent
Blake

(10) Number: US 6,195,863 C1
(45) Certificate Issued: Dec. 1, 2015

(54) DISC BRAKE PISTON INSTALLATION TOOL

(76) Inventor: Basil R. Blake, Lockport, NY (US)

Reexamination Request:
No. 90/013,154, Feb. 21, 2014

Reexamination Certificate for:
Patent No.: 6,195,863
Issued: Mar. 6, 2001
Appl. No.: 09/544,038
Filed: Apr. 6, 2000

(51) Int. Cl.
B23P 19/04 (2006.01)
B25B 27/00 (2006.01)
F16D 55/02 (2006.01)
B60T 17/22 (2006.01)

(52) U.S. Cl.
CPC .......... *B25B 27/0035* (2013.01); *B60T 17/221* (2013.01); *F16D 55/02* (2013.01); *F16D 2250/0084* (2013.01); *Y10T 29/53683* (2015.01); *Y10T 29/53891* (2015.01)

(58) Field of Classification Search
USPC .......................................................... 29/239
See application file for complete search history.

(56) References Cited

To view the complete listing of prior art documents cited during the proceeding for Reexamination Control Number 90/013,154, please refer to the USPTO's public Patent Application Information Retrieval (PAIR) system under the Display References tab.

*Primary Examiner* — Jeffrey L Gellner

(57) ABSTRACT

A pneumatically operated disc brake piston installation tool is disclosed for use in installing a piston into the piston bore of a disc brake caliper housing. The tool comprises a first piston engaging plate and a second plate positionable against the inside surface of an outer shoe bracket of the caliper housing. A cylinder extends from the second plate. A piston shaft is centrally attached to the first plate and extends perpendicularly therefrom, passing slidably through an opening in the second plate into the cylinder. In response to pneumatic pressure, the piston shaft is pushed outwardly against the piston to force the piston back into the piston bore of the caliper housing.

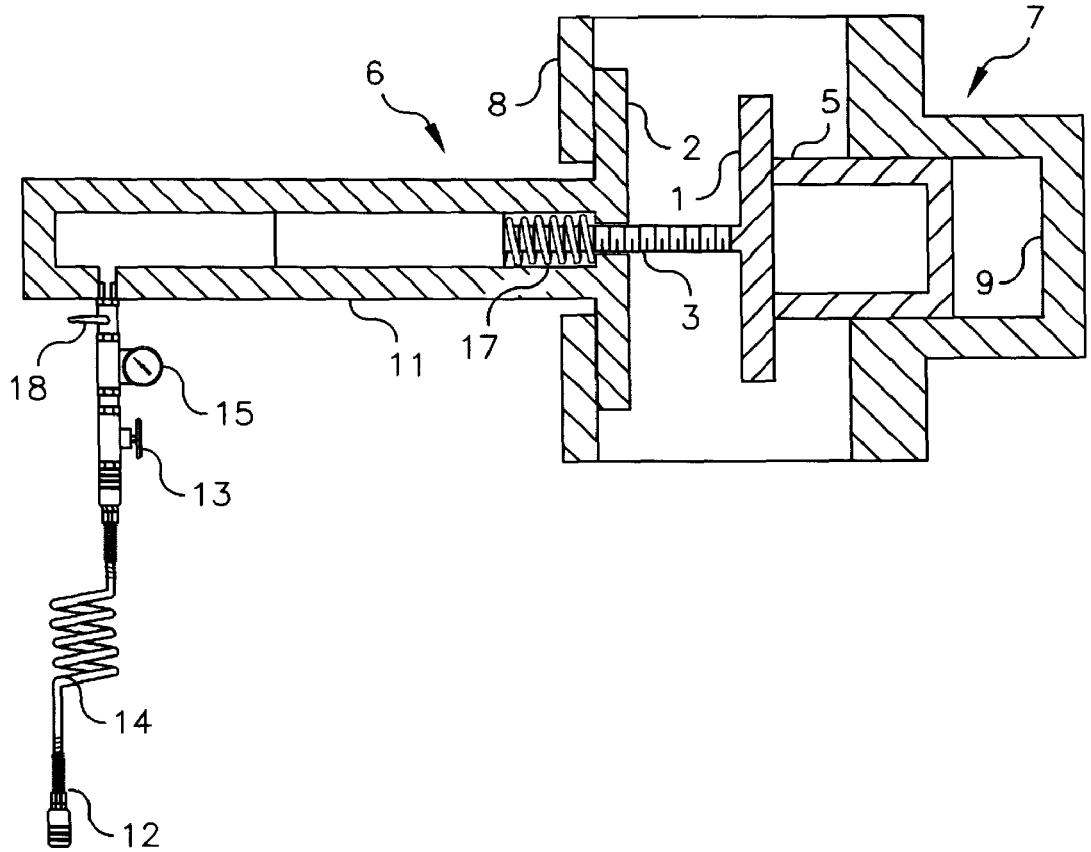

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 7 and 8 is confirmed.

Claims 1, 2 and 6 are determined to be patentable as amended.

Claims 3, 4 and 5, dependent on an amended claim, are determined to be patentable.

1. A pneumatically operated disc brake piston installer comprising:
   A) a first plate positionable within a disc brake caliper housing in contact with an outer edge of an extended disc brake piston;
   B) a second plate in alignment with and spaced apart from the first plate and positionable against an inside surface of an outer shoe bracket of said disc brake caliper housing;
   C) a piston shaft attached to said first plate at a central point thereof and extending perpendicularly therefrom passing slidably through an opening in said second plate into a surrounding cylinder attached to said second plate; said piston shaft being controllably moveable in an axial direction in response to pneumatic pressure within said cylinder; *wherein said piston shaft comprises a first portion and a second portion threadably connected to permit changing of the length of said shaft with a resultant change of distance between said first plate and said second plate*;
   D) a source of pneumatic pressure adapted for controllably moving said piston shaft out of said cylinder and pushing said first plate in a direction away from said second plate.

2. A pneumatically operated disc brake piston installer according to claim [1] *6* wherein said piston shaft comprises a first portion and a second portion threadably connected to permit changing of the length of said shaft with a resultant change of distance between said first plate and said second plate.

6. A pneumatically operated dual disc brake piston installer for the installation of dual pistons in a dual disc brake caliper housing, said dual disc brake piston installer comprising two [of said] disc brake installers [according to claim 1] yoked in a side by side relationship, *each of said two disc brake installers comprising:*
   A) *a first plate positionable within a disc brake caliper housing in contact with an outer edge of an extended disc brake piston;*
   B) *a second plate in alignment with and spaced apart from the first plate and positionable against an inside surface of an outer shoe bracket of said disc brake caliper housing;*
   C) *a piston shaft attached to said first plate at a central point thereof and extending perpendicularly therefrom passing slidably through an opening in said second plate into a surrounding cylinder attached to said second plate; said piston shaft being controllably moveable in an axial direction in response to pneumatic pressure within said cylinder;*
   D) *a source of pneumatic pressure adapted for controllably moving said piston shaft out of said cylinder and pushing said first plate in a direction away from said second plate.*

\* \* \* \* \*